US009815591B2

(12) United States Patent
Gatewood et al.

(10) Patent No.: US 9,815,591 B2
(45) Date of Patent: Nov. 14, 2017

(54) CONTAINER END CLOSURE WITH AN INTEGRAL FLUID CHANNEL

(71) Applicant: Ball Corporation, Broomfield, CO (US)

(72) Inventors: Erik E. Gatewood, Arvada, CO (US); Mark A. Jacober, Arvada, CO (US)

(73) Assignee: Ball Corporation, Broomfield, CO (US)

(*) Notice: Subject to any disclaimer, the term of this patent is extended or adjusted under 35 U.S.C. 154(b) by 5 days.

(21) Appl. No.: 14/831,067

(22) Filed: Aug. 20, 2015

(65) Prior Publication Data
US 2016/0052668 A1    Feb. 25, 2016

Related U.S. Application Data

(60) Provisional application No. 62/050,260, filed on Sep. 15, 2014, provisional application No. 62/039,830, filed on Aug. 20, 2014.

(51) Int. Cl.
B65D 17/00    (2006.01)
A23L 2/02    (2006.01)
A23L 2/00    (2006.01)

(52) U.S. Cl.
CPC .............. *B65D 17/165* (2013.01); *A23L 2/00* (2013.01); *A23L 2/02* (2013.01); *B65D 2517/0014* (2013.01); *B65D 2517/0056* (2013.01); *B65D 2517/0076* (2013.01); *B65D 2517/0077* (2013.01); *B65D 2517/0098* (2013.01)

(58) Field of Classification Search
CPC .... B65D 17/165; B65D 17/161; B65D 17/16; B21D 51/383; B21D 51/38; A23L 2/02; A23L 2/00

USPC ....... 220/269, 270, 271, 272, 268, 266, 265, 220/906, 601, 608, 623; 413/17, 15, 14, 413/12, 8; 53/492; 72/379.4, 379.2
See application file for complete search history.

(56) References Cited

U.S. PATENT DOCUMENTS

| 3,669,013 | A |   | 6/1972 | Stein |
| 4,927,048 | A |   | 5/1990 | Howard |
| 5,131,555 | A |   | 7/1992 | Demars et al. |
| 5,375,729 | A | * | 12/1994 | Schubert .............. B65D 17/165 220/269 |
| 5,555,993 | A |   | 9/1996 | Borkowski et al. |
| 5,743,445 | A |   | 4/1998 | Benarrouch |

(Continued)

OTHER PUBLICATIONS

International Search Report and Written Opinion for International (PCT) Patent Application No. PCT/US15/46142, dated Nov. 12, 2015, 8 pages.

(Continued)

Primary Examiner — Robert J Hicks
(74) Attorney, Agent, or Firm — Sheridan Ross P.C.

(57) ABSTRACT

An end closure for food and beverage containers is provided that comprises a novel center panel for collecting and distributing fluids and solids into a pour opening of the end closure. The fluids and solids may be juice and fruit or vegetable pieces. The end closure may further comprise a novel pull tab for assisting in the collection and distribution of the fluids and solids into the pour opening of the end closure. In one embodiment, the center panel comprises a catch basin and a luge for collecting and directing fluids and solids into the pour opening.

18 Claims, 9 Drawing Sheets

(56) References Cited

U.S. PATENT DOCUMENTS

| | | |
|---|---|---|
| 7,500,577 B2 * | 3/2009 | Wichelhaus ......... B65D 17/166 |
| | | 220/254.4 |
| 7,798,056 B2 | 9/2010 | Kramer |
| 7,975,884 B2 | 7/2011 | Mathabel et al. |
| 8,146,768 B2 | 4/2012 | Forrest et al. |
| 8,627,978 B2 | 1/2014 | Nishibe et al. |
| 2006/0162578 A1 | 7/2006 | Zellmer et al. |
| 2006/0163254 A1 | 7/2006 | Wichelhaus |
| 2013/0118133 A1 | 5/2013 | Jacober et al. |
| 2013/0134065 A1 | 5/2013 | Schorre |
| 2014/0061212 A1 | 3/2014 | Jacober et al. |
| 2016/0039565 A1 | 2/2016 | Gatewood |

OTHER PUBLICATIONS

International Search Report and Written Opinion for International (PCT) Patent Application No. PCT/US15/44657, dated Oct. 30, 2015, 9 pages.

* cited by examiner

CONTAINER END CLOSURE WITH AN INTEGRAL FLUID CHANNEL

CROSS-REFERENCE TO RELATED APPLICATION

This application claims priority to U.S. Provisional Patent Application Ser. No. 62/039,830, filed Aug. 20, 2014. This application also claims priority to U.S. Provisional Patent Application Ser. No. 62/050,260, filed Sep. 15, 2014, the entire disclosures of which are incorporated by reference herein.

FIELD OF THE INVENTION

Embodiments of the present invention generally relate to containers and container end closures. More specifically, embodiments of the present invention relate to metallic beverage container end closures with tabs, basins, channels, and/or luges for collecting fluids and solids and distributing the fluids and solids into the container.

BACKGROUND OF THE INVENTION

Containers, and more specifically metallic beverage containers, generally contain an end closure with a pull tab or other form of stay on tab ("SOT") to sever a score and form a pour opening. Users often like to add items to their beverages such as ice, fruit, vegetables, and liquids such as fruit juice, vegetable juice, hot sauce, etc. Specifically, users enjoy squeezing fresh fruit juice, e.g., lemon, lime, or orange, into the contents of their beverage containers, especially for beer, vodka, other alcoholic beverages, and soft drinks. This may be achieved by squeezing the fruit above the container's pour opening in hopes that most of the juice will make it into the container. The user may also shove the fruit into the container through the pour opening, if the fruit is small enough to fit through the pour opening. Multiple problems with these methods exist. First, juice is often spilled on the user or on areas surrounding the container, such as tables and chairs. Second, only a portion of the juice makes it into the container through the pour opening because juice is often spilled on the container end closure, or on the user, and eventually ends up in the moat area formed by the countersink of the end closure. Third, container end closures may have the opportunity to become dirty during transportation with the moat area having a higher likelihood of collecting dirt. Fourth, the user can cut his finger on the pour opening as he tries to push the fruit into the pour opening, which is usually smaller than the piece of fruit. Lastly, the size of the pour opening may prohibit adding the fruit or other material to container contents all together.

Accordingly, there exists a significant need for a beverage container end closure that assists a user in squeezing fresh juice into the container contents.

SUMMARY OF THE INVENTION

These and other needs are addressed by the various embodiments and configurations of the present invention. This invention relates to a novel system, device, and methods for providing a food and beverage container end closure with a luge, basin, channel, and/or tab for juice collection and distribution into the container. Note that the terms "basin," "catch basin," and "collection area" can be used interchangeably herein and the terms "collection area," "channel," "groove," and "luge" can be used interchangeably herein. A "luge," as used herein, is a channel, groove, or trough that is typically lower than the surrounding surface and directs fluids and solids to a predetermined location. The novel end closure provided herein allows the user to easily and effectively get fresh juice into the container.

Features of the present invention may be employed in a wide range of food and beverage containers, including pressurized beverage containers with SOTs secured by a rivet, food containers with tear away lids, and full-panel easy-open end tabs, to name a few. While some embodiments of the present invention are described as metal or metallic, one skilled in the art will appreciate that aspects of the present invention may be applied to other container materials such as plastic, glass, tin-coated steel alloys, and containers and end closures with coatings such as epoxy resin.

Thus, it is one aspect of various embodiments of the present invention to provide an end closure that assists in the collection and distribution of juice into the container. A further aspect of various embodiments of the present invention is to provide a metallic end closure with a tab, basin, channel, and/or luge that assists in the collection and distribution of juice into the container.

One aspect of various embodiments of the present invention is to provide an end closure that directs freshly squeezed juice into the container contents. One advantage of some embodiments is that less fruit juice is spilled on the user and/or surrounding areas when the user squeezes juice onto the end closure of the container. Additionally, more juice ends up in the container rather than on the user, on surrounding areas, or in the moat formed by the countersink. Thus, embodiments of the present invention are less messy and less sticky due to the reduced juice spillage.

It is another aspect of embodiments of the present invention to provide a container end closure that provides olfactory stimulation to the user as the user drinks the container contents. Thus, juice remaining in the tab, on the tab, in the catch basin, and/or in the luge can provide such olfactory stimulation.

One aspect of some embodiments of the present invention is to provide a container end closure that safely enables a user to squeeze juice into the container. Thus, the end closure of the present invention reduces the likelihood a user will cut himself on the sharp edges of the pour opening while trying to get juice, fruit, etc. into the container.

It is another aspect of embodiments of the invention to provide a container end closure in which dirt and/or debris is not carried by the juice into the container, the container contents, and/or a user's mouth. Accordingly, the end closure may comprise a sticker, protective film, or selectively removable seal over the catch basin and/or luge to keep the catch basin and/or luge clean. A user can pull off the sticker, film, or seal prior to introducing juice, fruit, etc. into the batch basin, luge, channel, or pour opening.

In various embodiments, an end closure for directing juice into a pour opening of a container is provided with a SOT, the end closure comprising: a peripheral curl which is adapted for interconnection to a neck of the container; a chuck wall extending downwardly from the peripheral curl; a countersink interconnected to a lower end of the chuck wall; an inner panel wall extending upwardly from an interior portion of the countersink; a center panel interconnected to an upper portion of the inner panel wall; a score line in the center panel which defines the pour opening; a pull tab operably interconnected to the center panel at an interconnection point, the pull tab comprising a nose and a tail opposite the nose; a deboss area in the center panel; a catch basin in at least one of the deboss area and the center panel, where a lowermost portion of the deboss area is positioned above a lowermost portion of the catch basin; and a luge having a first end interconnected to the catch basin and a second end extending into a portion of the pour opening, where the lowermost portion of the deboss area is positioned above a lowermost portion of the luge, and where juice is collected in the catch basin and directed through the luge and into the pour opening of the container.

In one embodiment, a metallic end closure for directing fluid into a pour opening of a container is provided comprising: a peripheral curl which is adapted for interconnection to a neck of the container; a chuck wall extending downwardly from the peripheral curl; a countersink interconnected to a lower end of the chuck wall; an inner panel wall extending upwardly from an interior portion of the countersink; a center panel interconnected to an upper portion of the inner panel wall; a score line in the center panel which defines a pour opening; a pull tab operably interconnected to the center panel at an interconnection point, the pull tab comprising a nose and a tail opposite the nose; and a luge having a first end and a second end extending into a portion of the pour opening, where the lowermost portion of the center panel is positioned above a lowermost portion of the luge, and where the fluid is directed through the luge and into the pour opening of the container. In additional embodiments, the pull tab further comprises one or more embossed forms positioned between the tail and the interconnection point. In some embodiments, the end closure further comprises a deboss area in the center panel, where at least a portion of the luge is positioned in the deboss area, and a catch basin in at least one of the center panel and the deboss area, where a lowermost portion of the deboss area is positioned above a lowermost portion of the catch basin. In one embodiment, the deboss area further comprises upwardly projecting protuberances. In further embodiments, the end closure further comprises a catch basin in the center panel, and the fluid is collected in the catch basin and directed through the luge and into the pour opening of the container. In some embodiments, the center panel has a first surface area and the catch basin has a second surface area, and where the second surface area is at least about 20% of the first surface area. In further embodiments, at least a portion of the catch basin is positioned an elevation below the pull tab. In some embodiments, the end closure also includes a selectively removable seal on at least one of the catch basin and the luge.

In one embodiment, a metallic end closure for directing fluid into a pour opening of a container is provided, comprising: a peripheral curl; a center panel positioned inwardly from the peripheral curl; a score line in the center panel defining a pour opening; a deboss area in the center panel; a pull tab operably interconnected to the deboss area at an interconnection point, the pull tab comprising a nose on a first end and a tail on a second end opposite the first end; and a channel having a first end positioned proximate to the pull tab and a second end extending into a portion of the pour opening, and where a portion of the fluid is collected in the deboss area and directed through the channel and into the pour opening of the container. In further embodiments, the end closure further comprises a raised portion positioned between the channel and the deboss area or a catch basin positioned in at least one of the deboss area and the center panel, where the catch basin is interconnected to the channel. Additionally, a lowermost portion of the deboss area is positioned above a lowermost portion of at least one of the catch basin and the channel, and where the lowermost portion of the deboss area is positioned below the center panel. Alternatively, a lowermost portion of the deboss area is positioned below a lowermost portion of at least one of the catch basin and the channel, and where the lowermost portion of the deboss area is positioned below the center panel. Alternatively, a lowermost portion of the deboss area and a lowermost portion of at least one of the catch basin and the channel are positioned at approximately a same height, and where the lowermost portion of the deboss area is positioned below the center panel. Alternatively, a lowermost portion of the deboss area is positioned below a lowermost portion of at least one of the catch basin and the channel, and where the center panel is positioned above the lowermost portion of the deboss area. In some embodiments, the end closure further comprises a plurality of upwardly projecting protuberances positioned in at least one of the deboss area and the center panel. In one embodiment, the luge has a width that is less than 50% of a width of the catch basin.

In one embodiment of the present invention, the pull tab further comprises one or more embossed forms positioned between the tail and the interconnection point. In some embodiments, the center panel has a first surface area and the catch basin has a second surface area, and the second surface area is at least about 20% of the first surface area. In one embodiment, the catch basin is positioned in a portion of the center panel on a side of the interconnection point opposite the pour opening. In alternate embodiments, the catch basin is positioned in a portion of the center panel on a side of the pull tab. Additionally, the luge or channel can have a width that is less than 50% of a width of the catch basin or the luge can have a width that is less than 25% of a width of the catch basin. Further, the lowermost portion of the catch basin is above the lowermost portion of the luge. In some embodiments, the end closure further comprises a selectively removable seal on at least one of the catch basin and the luge.

Various methods of introducing juice into a beverage container are provided. In one embodiment, a method is provided comprising: providing an end closure including a tear panel defining a pour opening, a center panel, a catch basin in the center panel, a luge having a first end interconnected to the catch basin and a second end extending into a portion of the tear panel, and a pull tab operably interconnected to the center panel at an interconnection point, the pull tab comprising a nose and a tail opposite the nose, where a lowermost portion of the center panel is positioned above a lowermost portion of the catch basin, and where the lowermost portion of the center panel is positioned above a lowermost portion of the luge; lifting the tail of the pull tab to open the pour opening by separating the tear panel from the center panel; pushing the fruit on an upper surface of the catch basin to extract juice from the fruit; and directing the juice through the luge and into the pour opening. In further embodiments, the method further comprises pushing on the tail of the pull tab such that a lower surface of the pull tab pushes on the fruit. In one embodiment, the method further comprises removing a selectively removable seal positioned over at least one of the catch basin and the luge prior to pushing the fruit on an upper surface of the catch basin.

In one embodiment, a method of introducing juice into a beverage container is provided, comprising: providing an end closure including: a center panel comprising a tear panel defining a pour opening, a catch basin, a luge having a first end positioned within the catch basin and a second end extending into a portion of the tear panel; and a pull tab operably interconnected to the center panel at an interconnection point, the pull tab comprising a nose and a tail opposite the nose, where a substantially flat portion of the center panel is positioned above a lowermost portion of the catch basin, and where the substantially flat portion of the center panel is positioned above a lowermost portion of the luge; lifting the tail of the pull tab to separate the tear panel from the center panel to open the pour opening; introducing the juice into the catch basin; and directing the juice through the luge and into the pour opening. In additional embodiments, a portion of the catch basin is positioned below the pull tab, and further comprising pushing on the tail of the pull tab such that a lower surface of the pull tab pushes on a fruit piece. In a further embodiment, the method also comprises removing a selectively removable seal positioned over at least one of the catch basin and the luge prior to prior to introducing the juice into the catch basin.

In some embodiments, the end closure may include a large stay on tab. The tab may be wider than typical SOTs to accommodate a fruit or vegetable slice. The fruit or vegetable slice may be pressed into the top of the tab or may be pressed between the bottom surface of the tab and the upper surface of the center panel. U.S. patent application Ser. No. 14/823,514 entitled "Pull Tab for Collection and Distribution of Juice into a Beverage Container" discloses a large pull tab and is incorporated by reference herein in its entirety.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

Figure 1:
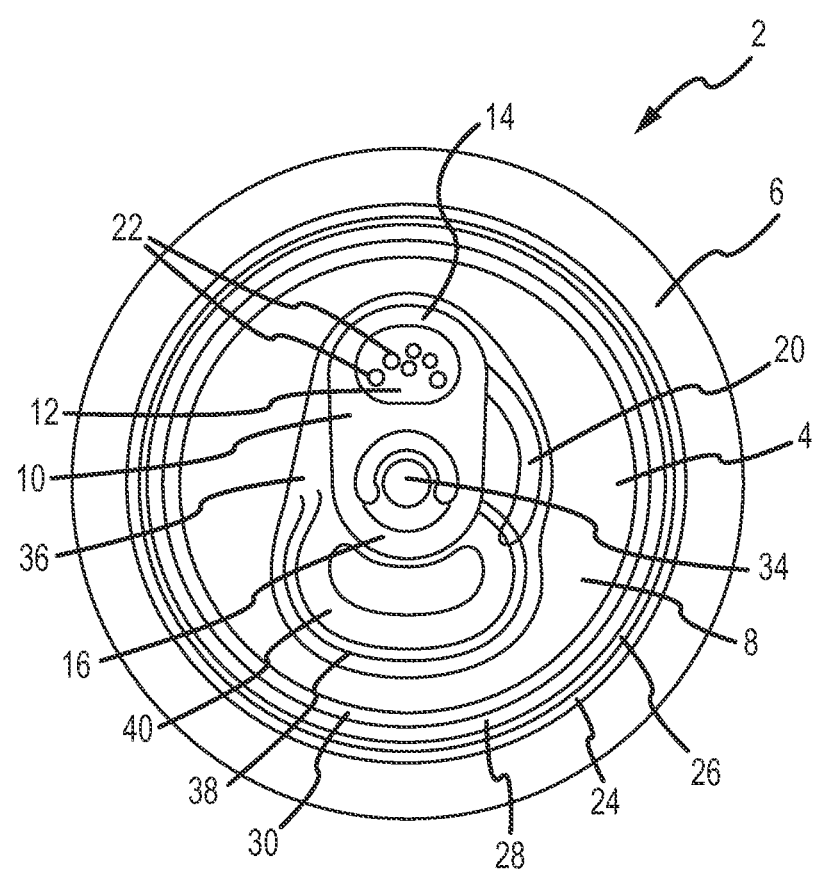
FIG. 1 is a top plan view of the public side of an end closure according to one embodiment of the present invention.

To assist in the understanding of the embodiments of the present invention the following list of components and associated numbering found in the drawings is provided herein:

| No. | Component |
|-----|-----------|
| 2   | Container |
| 4   | End Closure |
| 6   | Container Body |
| 8   | Center Panel |
| 10  | Tab |
| 12  | Deboss Area (of Tab) |

-continued

| No. | Component |
|---|---|
| 14 | Tail (of Tab) |
| 16 | Nose (of Tab) |
| 18 | Catch Basin/Fluid Collection Area |
| 20 | Luge |
| 22 | Forms (of Tab) |
| 24 | Top of Double Seem |
| 26 | Chuck Wall |
| 28 | Countersink |
| 30 | Panel Radius |
| 32 | End of Luge |
| 34 | Rivet/Interconnection Point |
| 36 | Deboss Area (of Center Panel) |
| 38 | Score Line |
| 40 | Tear Panel |
| 42 | Pour Opening |
| 44 | Deboss Area (of Tear Panel) |
| 46 | Form (of Center Panel) |
| 48 | Horizontal Plane of Upper Surface (of Center Panel) |
| 50A | First Raised Portion |
| 50B | Second Raised Portion |
| 52 | Inclined Wall Portion |
| 54 | Horizontal Plane of Bottom Surface (of Deboss) |
| 60 | Upper Surface (of Pull Tab) |
| 62 | Lower Surface (of Pull Tab) |
| H1 | Height of Deboss |
| H2 | Height of Catch Basin/Luge |
| H3 | Height of First Raised Portion |
| H4 | Height of Second Raised Portion |
| H5 | Height of Center Panel |
| H6 | Height of First Raised Portion |
| H7 | Height of Second Raised Portion |
| H8 | Height of Deboss |
| R1 | Radius of Curvature |
| R2 | Radius of Curvature |
| R3 | Radius of Curvature |
| R4 | Radius of Curvature |
| R5 | Radius of Curvature |
| R6 | Radius of Curvature |
| R7 | Radius of Curvature |
| R8 | Radius of Curvature |
| R9 | Radius of Curvature |
| R10 | Radius of Curvature |

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures depict metal end closures, container bodies, scores, basins, luges, embossed tabs, and methods and systems for using the same, the present invention is not limited to these embodiments. It should also be understood that the terms "container" and "container body"; "end closure" and "container end closure"; "tear panel" and "tear portion"; "opening" and "pour opening"; "tail" and "tail end"; and "luge," "channel," "groove," and "collection area"; and "basin," "catch basin," and "collection area" may be used interchangeably in some instances. Embodiments of the present invention function with fruit and vegetables. Accordingly, any time the term "fruit" is used herein, it should be understood that "fruit or vegetable" is meant. Additionally, embodiments of the present invention function with liquids and solids. Accordingly, any time the term "liquid" or "juice" is used herein, it should be understood that "liquid and/or solid" is meant.

Referring to FIG. 1, a top plan view of one embodiment of a container 2 comprising an end closure 4 double seamed to a container body 6 is shown. The top of the double seam 24 is visible in FIG. 1. The end closure 4 is for juice collection and distribution into the beverage container 6. The end closure 4 comprises a chuck wall 26 interconnected to a countersink 28. The end closure 4 also comprises a panel radius 30 interconnected to a perimeter edge of a center panel 8 having a substantially flat portion and a pull tab 10 interconnected to the center panel 8 at an interconnection point or rivet 34.

The tab 10 has a nose 16 and a tail 14. In one embodiment, the tab 10 has an open portion (not shown) between the rivet 34 and the tail 14. In another embodiment, the tab 10 does not have an opening positioned proximate to the tail 14 of the tab 10, nor does the tab 10 have a traditional lift ring or pull ring, rather an embossed or debossed portion (also called the tab deboss area herein) 12 comprises an area of the tab 10 where the hole in the lift ring is traditionally positioned. Thus, the tab deboss area 12 is positioned between the interconnection point 34 and the tail 14. Some embodiments include the tab deboss area 12 because the portion of the tab 10 proximate the tail 14 and on the side of the rivet 34 opposite the tear panel 40 (e.g., the deboss area 12) can act as a juice squeezer to assist in squeezing juice from fruit or vegetables. The embossed forms may be embossed or they may be formed in any other way known in the art.

In various embodiments, the deboss area 12 of the tab 10 has one or more forms 22 or perforations. In one embodiment the forms 22 are round and can be round dimple-style embossed forms. In another embodiment, the forms 22 are embossed. However, the forms 22 can be any shape, size, or style in other embodiments. In some embodiments, the plurality of forms includes forms 22 of multiple different shapes. In one embodiment, the forms 22 extend downward below a lower surface of the deboss area 12 of the tab 10. In some embodiments, the forms 22 extend away from a lower (i.e., under) surface of the tab 10. Thus, the forms 22 extend downwardly from the tab 10 such that the forms 22 can push into a fruit piece positioned between the tab tail 14 and the center panel 8 to squeeze juice out of the fruit piece. The forms 22 help squeeze the juice out of the fruit piece. In still other embodiments, the deboss area 12 of the tab 10 includes holes or perforations rather than forms. The holes or perforations can provide friction for the user's thumb or finger when pushing on a fruit piece or the holes or perforation can allow juice to flow through the holes and into the catch basin 18, luge 20, or deboss area 36.

The center panel 8 includes a score line 38 defining a tear panel 40, a deboss area 38, and a luge 20. The end closure 4 is shown in a closed position, i.e., the pour opening is closed because the tear panel 40 has not yet been separated from the rest of the center panel 8. In some embodiments the score line 38, tab 10, and luge 20 are positioned within the deboss area 36, while in other embodiments all or a portion of the score line 38, all or a portion of the tab 10, and/or all or a portion of the luge 20 are not positioned in the deboss area 36.

Figure 2:
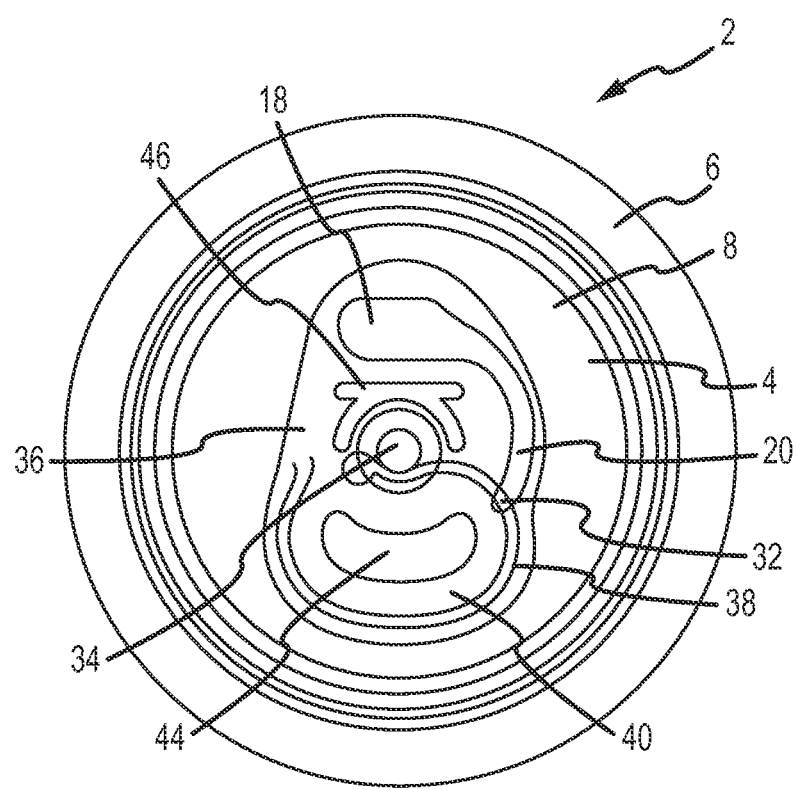
FIG. 2 is a top plan view of the public side of the end closure shown without the tab.

FIG. 2 is a top plan view of the end closure 4 double seamed to the container body 6. The end closure 4 is shown without a tab. One novel aspect of embodiments of the present invention lies in the combination of the tab and the end closure, both of which can be various sizes, shapes, and/or types. Thus, various different tabs could be interconnected to a number of different end closures. The end closure 4, for interconnection to a container body 6, generally comprises a center panel 8, a deboss area 36, a score 38 defining a tear panel 40 and pour opening, a means for collecting and distributing juice into the container through the pour opening, and a form 46 positioned such that a portion of the form 46 is below the tab. The form 46 may strengthen the center panel 8 and/or raise the tab such that a user can get her finger under the tail of the tab. The form 46 is positioned on the center panel 8 on a side of the rivet 34 opposite the tear panel 40. The tear panel 40 also includes a deboss area 44 in one embodiment. In some embodiments, the deboss area 36 is for the tab and pour opening. In other embodiments, the deboss area 36 also comprises at least a portion of at least one of the luge 20 and catch basin 18. The end closure 4 can include a pull tab (not shown) interconnected to the center panel 8 through a rivet 34.

In one embodiment, the means for collecting and distributing juice into the container includes a luge 20 (also called a "channel" herein) and a catch basin 18 (also called a "basin" or a "juice collection area" herein). In some embodiments, the catch basin 18 is interconnected to the luge 20. In one embodiment, a first end of the luge 20 is interconnected to the catch basin 18. In some embodiments, a first end of the luge 20 is positioned within the catch basin 18. In further embodiments, a second end 32 of the luge 20 crosses the score line 38 such that juice can flow through the luge 20 and into the pour opening once the tear panel 40 has been separated from the center panel 4 and the pour opening has been opened. This permits juice to be deposited into the container contents. In various embodiments, the catch basin 18 is positioned in the center panel 8 on a side of the rivet 34 opposite the tear panel 40. Additionally, the catch basin 18 and luge 20 may be positioned within the deboss area 36 of the center panel 8 or alternatively a portion of the catch basin 18 and/or luge 20 may be positioned outside of the deboss area 36.

Figure 3:
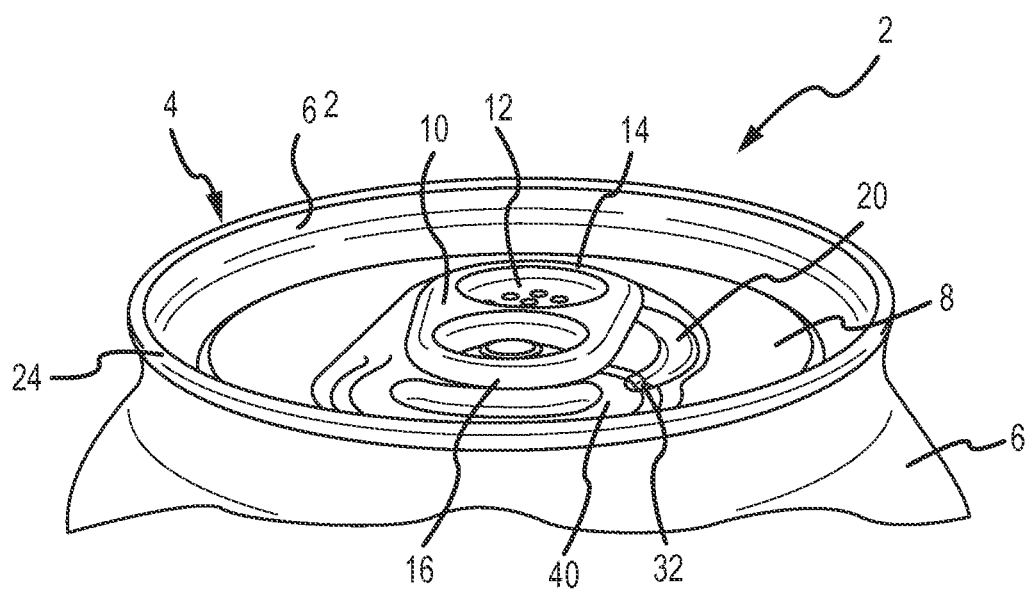
FIG. 3 is a front perspective view of the end closure.

FIG. 3 is a front perspective view of the container 2 with the end closure 4 double seamed to the neck of the container body 6. Extending downwardly and inwardly from the top of the double seam 24 is the chuck wall 26. Additionally, the relative height of one embodiment of the luge 20 and the juice flow direction into the pour opening can be seen in FIG. 3. In this embodiment, the curved shape of the luge 20 efficiently directs the juice from the catch basin into the pour opening after the tear panel 40 is separated from the center panel 8. The relative height of one embodiment of the tab 10 with the deboss area 12 is shown.

Figure 4:
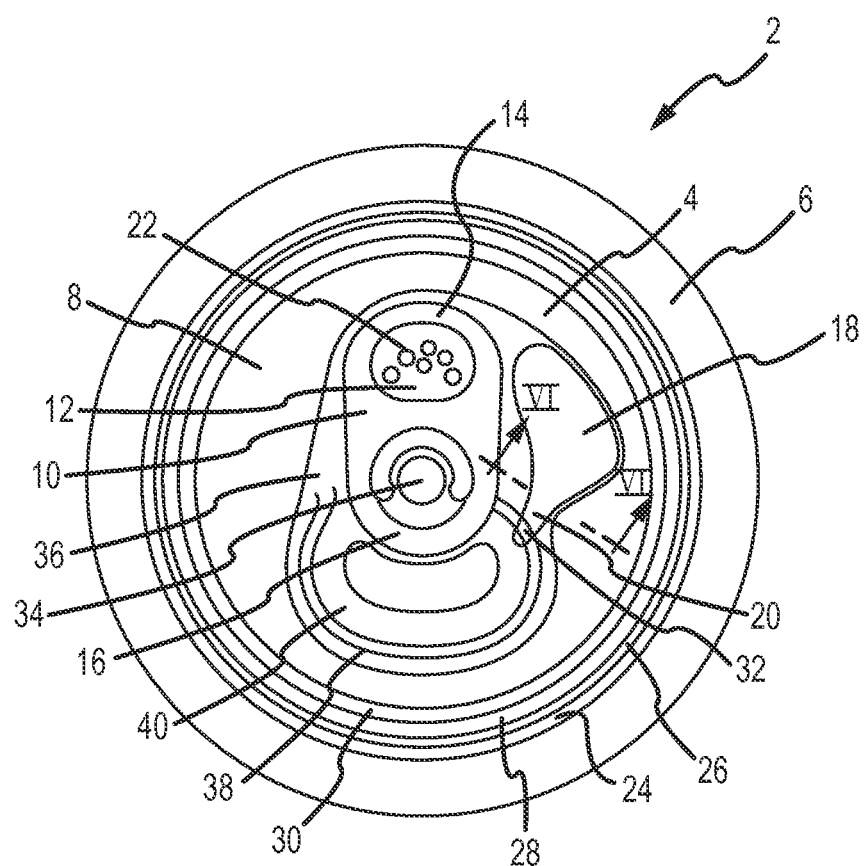
FIG. 4 is a top plan view of the public side of an end closure according to a second embodiment of the present invention.

FIG. 4 is a top plan view of a container 2 with an end closure 4 double seamed 24 to a container body 6. The end closure 4 shown is a second embodiment of the present invention and includes cut VI-VI. FIGS. 6A-6F depict numerous cross-sectional views taken at cut VI-VI showing embodiments VI-VI-A to VI-VI-F of end closures according to various embodiments. The end closure 4 comprises a chuck wall 26 interconnected to a countersink 28. The end closure 4 also comprises a panel radius 30 interconnected to a perimeter edge of a center panel 8 having a substantially flat portion and a pull tab 10 interconnected to the center panel 8 at an interconnection point or rivet 34.

The tab 10 has a nose 16 and a tail 14. In one embodiment, the tab 10 has an embossed or debossed portion (also called the tab deboss area herein) 12 positioned between the interconnection point 34 and the tab tail 14. In various embodiments, the deboss area 12 of the tab 10 has one or more forms 22 or perforations. In one embodiment, the forms 22 extend downward below a lower surface of the deboss area 12 of the tab 10. The forms 22 help squeeze the juice out of the fruit piece.

The center panel 8 includes a score line 38 defining a tear panel 40, a deboss area 38, a catch basin 18, and a luge 20. The end closure 4 is shown in a closed position, i.e., the pour opening is closed because the tear panel 40 has not yet been separated from the rest of the center panel 8. In some embodiments the score line 38, tab 10, catch basin 18, and luge 20 are positioned within the deboss area 36, while in other embodiments all or a portion of the score line 38, all or a portion of the tab 10, all or a portion of the catch basin 18, and/or all or a portion of the luge 20 are not positioned in the deboss area 36. In the embodiment shown, the catch basin 18 is positioned in the deboss area 36 on a side of the tab 10. The novelty of this embodiment lies in the deboss area 36 with the catch basin 18 and juice luge 20, which can be used with a tab of any size, shape, or type. In alternate embodiments, the catch basin and/or luge 20 is positioned in at least one of the center panel 8 and deboss area 36.

In some embodiments, the catch basin 18 is interconnected to the luge 20. In one embodiment, a first end of the luge 20 is interconnected to the catch basin 18. In some embodiments, a first end of the luge 20 is positioned within the catch basin 18. In further embodiments, a second end 32 of the luge 20 crosses the score line 38 such that juice can flow through the luge 20 and into the pour opening once the tear panel 40 has been separated from the center panel 4 and the pour opening has been opened. This permits juice to be deposited into the container contents.

Figure 5:
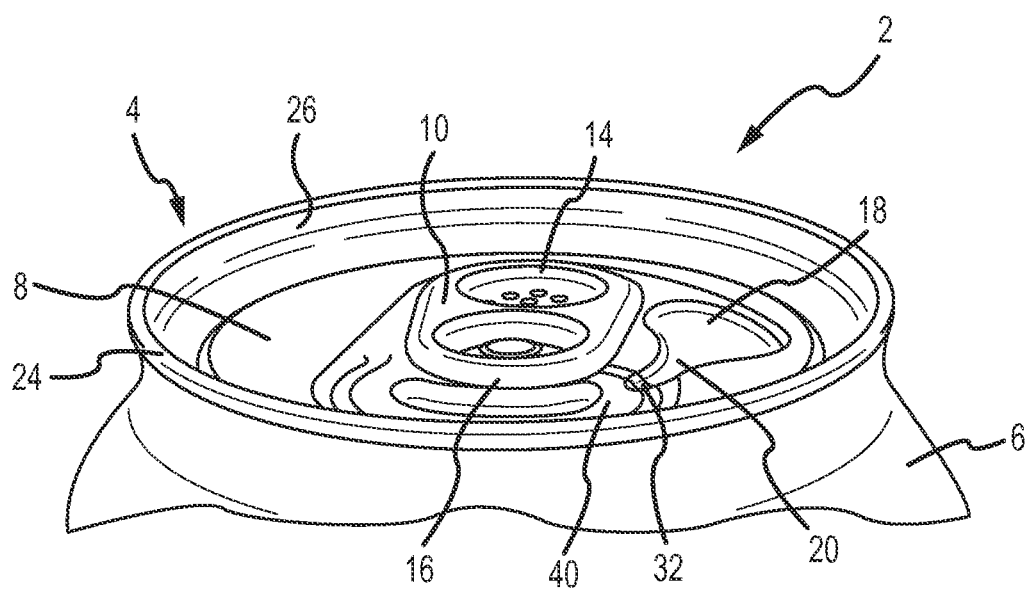
FIG. 5 is a front perspective view of the end closure of FIG. 4.

The invention, according to the embodiment shown in FIGS. 4-5, functions by a user pushing or squeezing a piece of fruit onto the catch basin in the center panel. Thus, after the user lifts the tail of the tab and uses the nose of the tab to fracture the score and open the container, the user can rotate the tab such that the tab tail is positioned over the catch basin. Then the user can use the tab tail to push on and squeeze juice out of the fruit and into the catch basin. Alternatively, the user may not rotate the tab at all. Rather, the user may push the fruit down on the catch basin such that juice flows from the catch basin, through the luge, and into the pour opening.

FIG. 5 is a front perspective view of the container 2 with the end closure 4 of FIG. 4 double seamed to the neck of the container body 6. Extending downwardly and inwardly from the top of the double seam 24 is the chuck wall 26. Additionally, the relative heights of the luge 20 and catch basin 18 are more easily seen in FIG. 5, as is the juice flow direction into the pour opening. In this embodiment, the curved shape of the luge 20 efficiently directs the juice from the catch basin 18, through the luge 20, out the end 32 of the luge and into the pour opening after the tear panel 40 is separated from the center panel 8. The relative height of one embodiment of the tab 10 with the deboss area 12 is shown.

Regarding FIGS. 1-5, in one embodiment, the catch basin 18 and/or luge 20 are positioned lower or deeper than the center panel 8 and the deboss area 36 such that the catch basin 18 and luge 20 collect and direct the juice to the opening. In one embodiment, the bottom of at least one of the luge 20 and the catch basin 18 are angled toward the pour opening and tear panel 40 such that gravity moves the juice from the catch basin 18, through the luge 20, and into the pour opening. Accordingly, the lowermost portion of the luge 20 is positioned proximate to the pour opening. In other embodiments where the bottom of the catch basin 18 is the same height as the bottom of the luge 20 or the bottoms of the catch basin 18 and the luge 20 are not angled toward the pour opening, then juice remaining in the catch basin 18 or luge 20 can be directed to and along the luge 20 and into the pour opening as the user tips the container 2 to drink the contents of the container 2. Further, any juice remaining in catch basin 18 or luge 20 is positioned near the user's nose while the user is drinking from the container 2. This provides olfactory stimulation, which is another advantage of embodiments of the present invention. In some embodiments, the sides of the catch basin 18 and/or luge 20 are angled or curved to further direct juice through the luge 20 and into the pour opening.

According to some embodiments, the invention functions by a user pushing or squeezing a piece of fruit onto the catch basin 18 in the center panel 8 or deboss area 36 and positioned below the tail of the tab. Thus, after the user lifts the tail of the tab and uses the nose of the tab to fracture the score 38 and open the container 2, the tab tail can be used to push on and squeeze juice out of the fruit. The juice is directed into the catch basin 18 and through a luge 20 into the pour opening. Both the catch basin 18 and luge 20 can be embossed, stamped, punched, pressed, or formed any other way known in the art. For example, the luge 20 and/or catch basin 18 can be created by tooling inside of a conversion press die set. Thus, part of the shape of the luge 20 and/or catch basin 18 is on the punch and the other part of the shape of the luge 20 and/or catch basin 18 is on the die of the conversion press.

FIGS. 6A-6F show various embodiments of the cross-section of the end closure of FIG. 4 at cut VI-VI. The relative heights of the center panel 8, deboss 36, and catch basin 18 and/or juice luge 20 can be seen. Additionally, the catch basin 18 and/or juice luge 20 can include an inclined wall portion 52 or side wall. In some embodiments, on the upper surface of the end closure, the deboss area 36 is interconnected to the first raised portion 50A at a first radius of curvature R1; the first raised portion 50A or the deboss area 36 is interconnected to the catch basin 18 and/or juice luge 20 at a second radius of curvature R2; the catch basin 18 and/or juice luge 20 is interconnected to the second raised portion 50B or the deboss area 36 at a third radius of curvature R3; the second raised portion 50B is interconnected to the deboss area 36 at a fourth radius of curvature R4; and the deboss area 36 is interconnected to the center panel 8 at a fifth radius of curvature R5. In some embodiments, on the lower/under surface of the end closure, the center panel 8 is interconnected to the deboss area 36 at a sixth radius of curvature R6; the first raised portion 50A has a seventh radius of curvature R7; the second raised portion 50B has an eighth radius of curvature R8; the catch basin 18 and/or juice luge 20 is interconnected to the deboss area 36 at a ninth radius of curvature R9; and the deboss area 36 is interconnected to the catch basin 18 and/or juice luge 20 at a tenth radius of curvature R10. The floor of the catch basin 18 and/or luge 20 could be flat, angled, curved, arcuate, or have any other geometric profile as appreciated by one skilled in the art. However, the floor is shown as flat in the drawings for simplicity.

Figure 6A:
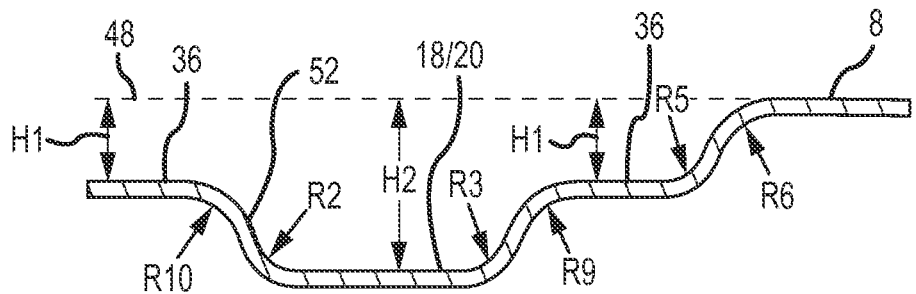
FIG. 6A is a cross-sectional front elevation view taken at line VI-VI of the end closure of FIG. 7.

FIG. 6A shows one embodiment of the cross-section of the end closure of FIG. 4 at cut VI-VI. The catch basin 18 and/or juice luge 20 are positioned lower than the deboss area 36, which is lower than the center panel 8. The catch basin 18 and/or juice luge 20 are positioned lower than a horizontal plane 48 defined by the upper surface of the center panel 8 a height H2, which is between about 0.065 inches and about 0.035 inches. The deboss area 36 is positioned lower than the horizontal plane 48 defined by the upper surface of the center panel 8 a height H1, which is between about 0.023 inches and about 0.014 inches.

Figure 6B:
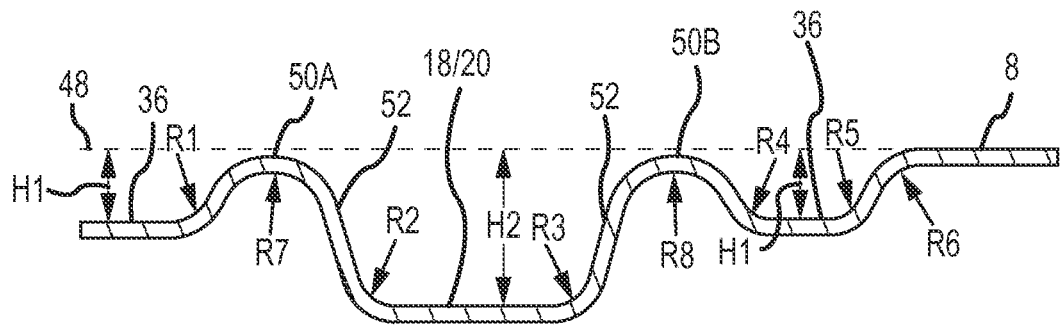
FIG. 6B is a cross-sectional front elevation view taken at line VI-VI-B of a third embodiment of an end closure.

FIG. 6B shows a second embodiment of the cross-section of the end closure of FIG. 4 at cut VI-VI. In this embodiment, the deboss area 36 is lower than the center panel 8 and the juice luge 20 and/or catch basin 18 are lower than the deboss area 36. Additionally, raised portions 50A, 50B are positioned on either side of the luge 20 and/or catch basin 18. The raised portions 50A, 50B may be the same height as the center panel 8 or they may be taller or shorter than the center panel 8. The catch basin 18 and/or juice luge 20 are positioned lower than a horizontal plane 48 defined by the upper surface of the center panel 8 a height H2, which is between about 0.050 inches and about 0.025 inches. The deboss area 36 is positioned lower than the horizontal plane 48 defined by the upper surface of the center panel 8 a height H1, which is between about 0.023 inches and about 0.014 inches.

Figure 6C:
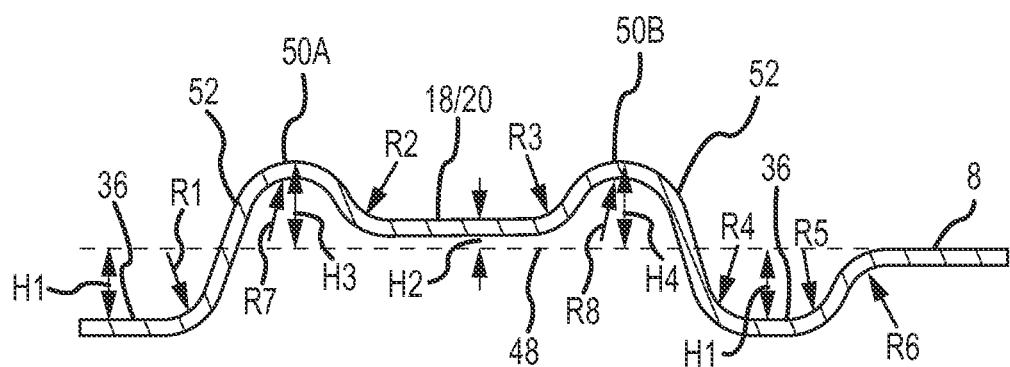
FIG. 6C is a cross-sectional front elevation view taken at line VI-VI-C of a fourth embodiment of an end closure.

FIG. 6C shows a third embodiment of the cross-section of the end closure of FIG. 4 at cut VI-VI. In this embodiment, the deboss area 36 is lower than the center panel 8. The deboss area 36 is positioned lower than the horizontal plane 48 defined by the upper surface of the center panel 8 a height H1, which is between about 0.023 inches and about 0.014 inches. However, the floor of the juice luge 20 and/or catch basin 18 is higher than the floor of the deboss 36 and higher than the floor of the center panel 8. The catch basin 18 and/or juice luge 20 are positioned above than a horizontal plane 48 defined by the upper surface of the center panel 8 a height H2, which is between about 0.030 inches and about 0.001 inches. Additionally, one raised portion 50A, 50B is positioned on either side of the luge 20 and/or catch basin 18. The raised portions 50A, 50B are taller than the center panel 8, deboss 36, and luge 20 and/or catch basin 18. The first raised portion 50A is positioned above than the horizontal plane 48 defined by the upper surface of the center panel 8 a height H3, which is between about 0.060 inches and about 0.034 inches. The second raised portion 50B is positioned above than the horizontal plane 48 defined by the upper surface of the center panel 8 a height H4, which is between about 0.060 inches and about 0.034 inches.

Figure 6D:
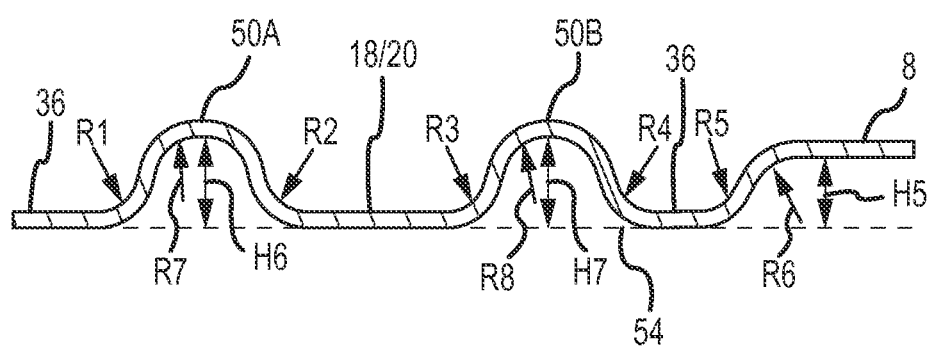
FIG. 6D is a cross-sectional front elevation view taken at line VI-VI-D of a fifth embodiment of an end closure.

FIG. 6D shows a forth embodiment of the cross-section of the end closure of FIG. 4 at cut VI-VI. The center panel 8 is higher than both the deboss 36 and the catch basin 18 and/or luge 20. Here, the floor of the catch basin 18 and/or luge 20 is the same height as the floor of the deboss area 36. Additionally, raised portions 50A, 50B are positioned on either side of the luge 20 and/or catch basin 18 to separate the luge 20 and/or catch basin 18 from the deboss area 36. The center panel 8 is positioned above a horizontal plane 54 defined by the bottom surface of the catch basin 18 and/or luge 20 a height H5, which is between about 0.013 inches and about 0.004 inches. The first raised portion 50A is positioned above than the horizontal plane 54 defined by the bottom surface of the catch basin 18 and/or luge 20 a height H6, which is between about 0.050 inches and about 0.020 inches. The second raised portion 50B is positioned above than the horizontal plane 54 defined by the bottom surface of the catch basin 18 and/or luge 20 a height H7, which is between about 0.050 inches and about 0.020 inches.

Figure 6E:
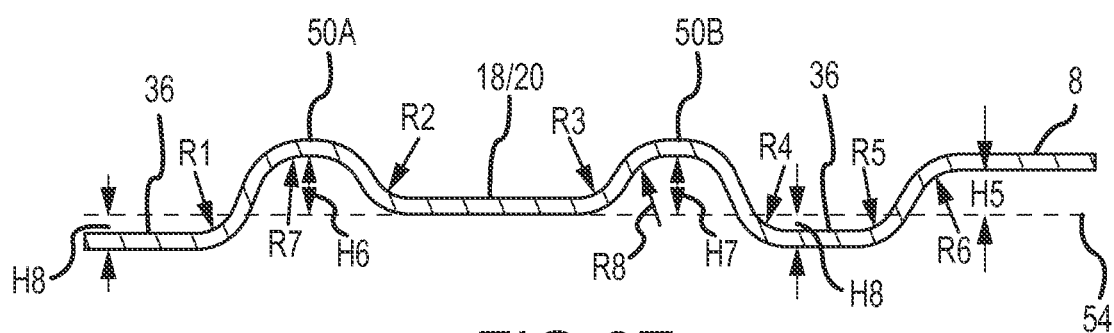
FIG. 6E is a cross-sectional front elevation view taken at line VI-VI-E of a sixth embodiment of an end closure.

FIG. 6E a fifth embodiment of the cross-section of the end closure of FIG. 4 at cut VI-VI. In this embodiment, the deboss area 36 and the juice luge 20 and/or catch basin 18 are lower than the center panel 8. Further, the deboss area 36 is lower than the juice luge 20 and/or catch basin 18. Additionally, one raised portion 50A, 50B is positioned on either side of the luge 20 and/or catch basin 18. The raised portions 50A, 50B are taller than the center panel 8, deboss 36, and luge 20 and/or catch basin 18. In alternate embodiments, the raised portions 50A, 50B can be the same height as the center panel 8. Here, the center panel 8 is positioned above a horizontal plane 54 defined by the bottom surface of the catch basin 18 and/or luge 20 a height H5, which is between about 0.011 inches and about 0.001 inches. The first raised portion 50A is positioned above than the horizontal plane 54 defined by the bottom surface of the catch basin 18 and/or luge 20 a height H6, which is between about 0.035 inches and about 0.010 inches. The second raised portion 50B is positioned above than the horizontal plane 54 defined by the bottom surface of the catch basin 18 and/or luge 20 a height H7, which is between about 0.035 inches and about 0.010 inches. The deboss area 36 is positioned below the horizontal plane 54 defined by the bottom surface of the catch basin 18 and/or luge 20 a height H8, which is between about 0.011 inches and about 0.001 inches.

Figure 6F:
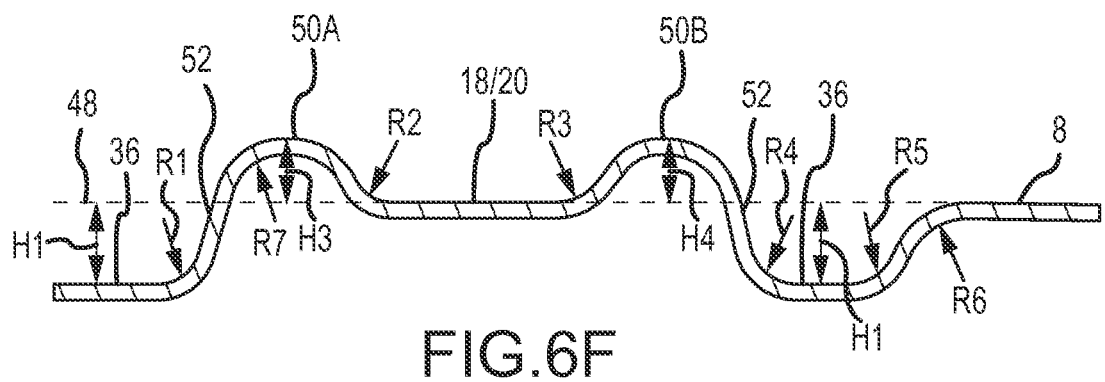
FIG. 6F is a cross-sectional front elevation view taken at line VI-VI-F of a seventh embodiment of an end closure.

FIG. 6F shows a sixth embodiment of the cross-section of the end closure of FIG. 4 at cut VI-VI. Here, the deboss area 36 is lower than both the center panel 8 and the juice luge 20 and/or catch basin 18. The deboss area 36 is positioned lower than the horizontal plane 48 defined by the upper surface of the center panel 8 a height H1, which is between about 0.023 inches and about 0.014 inches. The center panel 8 is the same height as the floor of the juice luge 20 and/or catch basin 18. Additionally, raised portions 50A, 50B are positioned on either side of the luge 20 and/or catch basin 18 to separate the luge 20 and/or catch basin 18 from the deboss area 36. The raise portions are taller than the center panel 8. The first raised portion 50A is positioned above than the horizontal plane 48 defined by the upper surface of the center panel 8 a height H3, which is between about 0.035 inches and about 0.010 inches. The second raised portion 50B is positioned above than the horizontal plane 48 defined by the upper surface of the center panel 8 a height H4, which is between about 0.035 inches and about 0.010 inches.

The raised portions 50A, 50B of FIGS. 6A-6F define or contain the catch basin 18 and/or luge 20. The raised portions 50A, 50B may be beads, forms, protuberances, raised tubes, or other raised portions known in the art. In some embodiments, the raised portions 50A, 50B extend across the score. In alternate embodiments, the raised portions 50A, 50B each have a break positioned proximate to the score line and the break allows the juice to flow into the opening of the container when the container is open.

Figure 7:
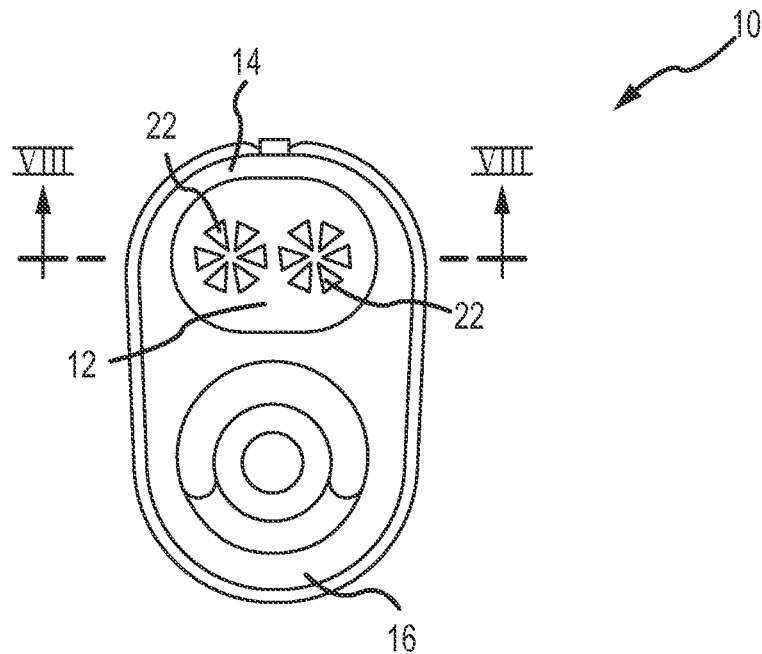
FIG. 7 is a top plan view of the public side of a tab according to a second embodiment.

FIG. 7 is a top plan view of the public side of a tab 10 according to a second embodiment. The tab 10 has a nose 16, tail 14, and a deboss area 12, which includes embossed shapes 22 that are different than the embossed forms of FIGS. 1, 3-5. Similar to the form of FIGS. 1, 3-5, the lower (i.e., bottom) surfaces of the embossed shapes 22 are lower than the bottom surface of the tab 10, which helps squeeze more juice out of the fruit using the tab 10.

Figure 8:
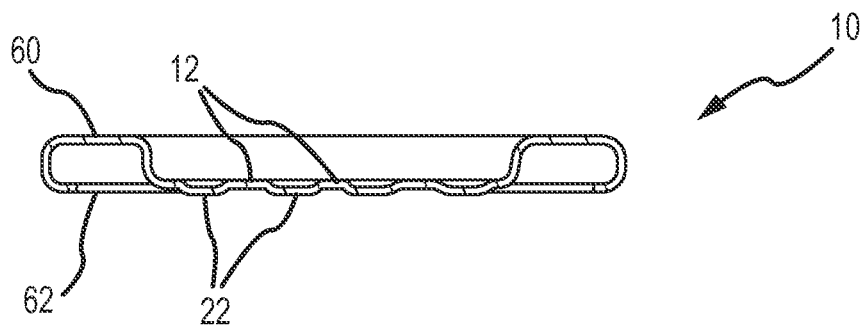
FIG. 8 is a cross-sectional view of the tab of FIG. 7 taken along the cut VIII-VIII.

FIG. 8 is a cross-sectional view of the tab of FIG. 7 taken along the cut VIII-VIII. The upper surface 60 of the pull tab 10 is substantially flat and the lower surface 62 of the pull tab 10 is also substantially flat, except for the embossed shapes 22. The embossed shapes 22 extend below the lower surface 62 of the tab 10. Additionally, the deboss area 12 of the tab 10 is positioned at a similar height to the lower surface 62 of the tab 10.

In various embodiments of the present invention, the tab can have embossed forms of different shapes, sizes, and configurations. Additionally, any number of embossed forms (one or more) can be used in various embodiments. The embossed forms may be embossed or they may be formed in any other way known in the art. Alternatively, the embossed forms may be bumps, protuberances, beads, walls, raised areas, or projections. The embossed forms may be rounded or may be pointy, like a cone or pyramid.

Various shapes and sizes of luges and catch basins can be used. The embodiments shown in the drawings are for illustrations purposes only. Thus, the shapes and sizes of the luges and catch basins may be different than those shown in the figures.

In alternate embodiments of the end closure, the pull tab, especially the tail, can be wider than is shown and the embossed forms can be holes rather than embossed forms. Thus, a user can place a fruit slice on top of the tab, specifically on the portion with the holes, and push the fruit slice into the tab such that juice is squeezed out of the fruit slice and through the holes, into the catch basin, through the luge, and into the pour opening. For example, a user can place a lime slice on the portion of the tab with the holes (peel side up and fruit side down on the holes) and push on the lime slice to squeeze juice out of the lime slice and through the holes, into the catch basin, through the luge, and into the pour opening.

In further embodiments of the present invention, the catch basin may further include raised beads, forms, bumps, protuberances, or other raised portions on the public side of the catch basin rather than or in addition to the embossed forms on the tab. Thus, when the user pushes the piece of fruit on the catch basin with raised portions, the raised portions assist the user in squeezing as much juice as possible out of a piece of fruit. In some embodiments of the present invention, the luge and/or catch basin may further include one or more debosses, grooves, troughs, or channels oriented toward the pour opening in order to direct the juice flow toward the opening.

In various embodiments of the present invention, the catch basin can be larger and/or shaped differently. For example, the catch basin may be football shaped, like a lime slice, or the catch basin may be circular to accommodate fruit of different shapes. Additionally, the luge may be larger (i.e., wider or longer) and may be on the opposite side of the rivet (i.e., on the left side of the end closure of FIGS. 2 and 4) in some embodiments.

In an alternate embodiment, the tab is larger than standard pull tabs and is larger than the tabs shown in the figures. Specifically, the area of the tab is equal to or greater than 25% of the area of the center panel, and in some embodiments at least 33% of the area of the center panel. Thus, the tab can cover a large portion of the center panel to accommodate large pieces of fruit. Additionally, the catch basin formed in the center panel may also be larger to further accommodate larger pieces of fruit. In one embodiment, the area of the catch basin comprises about 20% of the area of the center panel. In still further embodiments, the catch basin and/or luge may include a raised portion around the catch basin's and/or luge's perimeter.

In some embodiments, the tab and/or catch basin could include indicia. For example, the tab and/or catch basin could look like a piece or fruit or have a piece of fruit embossed or drawn on the tab and/or catch basin. In one embodiment, the catch basin and/or luge include a cover, sticker, protective film, or selectively removable seal, such as a piece of foil, cellophane, or tape material to keep the catch basin and/or luge clean and free of dirt and debris. Alternatively, the entire end closure may have a cover or selectively removable seal to keep the entire end closure clean and free of dirt and debris. The user can remove the cover or selectively removable seal before pushing the fruit on the catch basin.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A metallic end closure for directing fluid into a pour opening of a container, comprising:
   a peripheral curl which is adapted for interconnection to a neck of the container;
   a chuck wall extending downwardly from said peripheral curl;
   a countersink interconnected to a lower end of said chuck wall;
   an inner panel wall extending upwardly from an interior portion of said countersink;
   a center panel interconnected to an upper portion of said inner panel wall;
   a score line in said center panel which defines a pour opening;
   a pull tab operably interconnected to said center panel at an interconnection point, said pull tab comprising a nose and a tail opposite said nose;
   a luge having a first end positioned proximate to said tail of said pull tab and a second end positioned proximate to said pour opening when said end closure is in a closed position, wherein a lowermost portion of said center panel is positioned above a lowermost portion of said luge, and wherein the fluid is directed through said luge and into said pour opening of the container; and
   a deboss area in said center panel, wherein at least a portion of said luge is positioned in said deboss area when the fluid is directed through said luge.

2. The metallic end closure of claim 1, wherein said pull tab further comprises one or more embossed forms extending downwardly below a lower surface of said pull tab and positioned between said tail and said interconnection point.

3. The metallic end closure of claim 1, further comprising a catch basin in at least one of said center panel and said deboss area, wherein said catch basin is interconnected to said first end of said luge, and wherein a lowermost portion of said deboss area is positioned above a lowermost portion of said catch basin.

4. The metallic end closure of claim 1, wherein said deboss area further comprises at least one upwardly projecting protuberance positioned along at least one of a perimeter of said catch basin and a perimeter of said luge.

5. The metallic end closure of claim 1, further comprising a catch basin in said center panel, wherein said catch basin is interconnected to said first end of said luge, and wherein the fluid is collected in said catch basin and directed through said luge and into said pour opening of the container.

6. The metallic end closure of claim 5, wherein said center panel has a first surface area and said catch basin has a second surface area, and wherein said second surface area is at least about 20% of the first surface area.

7. The metallic end closure of claim 5, wherein at least a portion of said catch basin is positioned an elevation below said pull tab.

8. The metallic end closure of claim 5, further comprising a selectively removable seal on at least one of said catch basin and said luge.

9. A metallic end closure for directing fluid into a pour opening of a container, comprising:
   a peripheral curl;
   a center panel positioned inwardly from said peripheral curl;
   a score line in said center panel defining a pour opening;
   a deboss area in said center panel;
   a pull tab operably interconnected to said deboss area at an interconnection point, said pull tab comprising a nose on a first end and a tail on a second end opposite said first end;
   a channel having a first end positioned proximate to said pull tab and a second end extending into a portion of said pour opening, and wherein a portion of said fluid is collected in said deboss area and directed through said channel and into said pour opening of the container; and
   a catch basin positioned in at least one of said deboss area and said center panel, wherein said catch basin is interconnected to said channel.

10. The metallic end closure of claim 9, further comprising a raised portion positioned between said channel and said deboss area.

11. The metallic end closure of claim 9, wherein a lowermost portion of said deboss area is positioned above a lowermost portion of at least one of said catch basin and said channel, and wherein said lowermost portion of said deboss area is positioned below said center panel.

12. The metallic end closure of claim 9, wherein a lowermost portion of said deboss area is positioned below a lowermost portion of at least one of said catch basin and said channel, and wherein said lowermost portion of said deboss area is positioned below said center panel.

13. The metallic end closure of claim 9, wherein a lowermost portion of said deboss area and a lowermost portion of at least one of said catch basin and said channel are positioned at approximately a same height, and wherein said lowermost portion of said deboss area is positioned below said center panel.

14. The metallic end closure of claim 9, wherein a lowermost portion of said deboss area is positioned below a lowermost portion of at least one of said catch basin and said channel, and wherein said center panel is positioned above said lowermost portion of said deboss area.

15. The metallic end closure of claim 9, further comprising a plurality of upwardly projecting protuberances positioned in at least one of said deboss area and said center panel.

16. A method of introducing juice into a beverage container, comprising:

providing an end closure including:
- a peripheral curl which is adapted for interconnection to a neck of the beverage container;
- a chuck wall extending downwardly from said peripheral curl;
- a countersink interconnected to a lower end of said chuck wall;
- an inner panel wall extending upwardly from an interior portion of said countersink;
- a center panel interconnected to an upper portion of said inner panel wall, said center panel comprising a tear panel defining a pour opening, a deboss area, a catch basin, and a luge having a first end positioned within said catch basin and a second end extending into a portion of said tear panel, wherein at least a portion of said luge is positioned in said deboss area; and
- a pull tab operably interconnected to said center panel at an interconnection point, said pull tab comprising a nose and a tail opposite said nose, wherein a substantially flat portion of said center panel is positioned above a lowermost portion of said luge;

lifting said tail of said pull tab to separate said tear panel from said center panel to open said pour opening;

introducing the juice into said catch basin; and directing the juice through said luge and into said pour opening.

17. The method of claim 16, wherein a portion of said catch basin is positioned below said pull tab, and further comprising pushing on said tail of said pull tab such that a lower surface of said pull tab pushes on a fruit piece.

18. The method of claim 16, further comprising removing a selectively removable seal positioned over at least one of said catch basin and said luge prior to introducing the juice into said catch basin.

* * * * *